US009049836B2

(12) United States Patent
Lindgren

(10) Patent No.: US 9,049,836 B2
(45) Date of Patent: Jun. 9, 2015

(54) CHEESE FORMING APPARATUS AND METHOD

(71) Applicant: Daniel R Lindgren, Reedsville, WI (US)

(72) Inventor: Daniel R Lindgren, Reedsville, WI (US)

( * ) Notice: Subject to any disclaimer, the term of this patent is extended or adjusted under 35 U.S.C. 154(b) by 0 days.

(21) Appl. No.: 13/838,020

(22) Filed: Mar. 15, 2013

(65) Prior Publication Data

US 2013/0309378 A1    Nov. 21, 2013

(51) Int. Cl.
| *A01J 25/13* | (2006.01) |
| *A23P 1/12* | (2006.01) |
| *A23P 1/10* | (2006.01) |
| *A01J 25/00* | (2006.01) |
| *A01J 25/12* | (2006.01) |
| *A23L 1/00* | (2006.01) |
| *A23C 19/068* | (2006.01) |

(52) U.S. Cl.
CPC .. *A01J 25/13* (2013.01); *A23P 1/12* (2013.01); *A23P 1/105* (2013.01); *A01J 25/008* (2013.01); *A01J 25/12* (2013.01); *A01J 25/002* (2013.01); *A23L 1/0076* (2013.01); *A23L 1/0073* (2013.01); *A23C 19/0684* (2013.01)

(58) Field of Classification Search
CPC ............ A23C 19/0684; A23C 19/0908; A01J 25/008; A01J 25/12; A01J 25/002; A01J 25/114; A01J 25/13; B65B 63/08; B28B 5/027; B29C 43/22; A23L 1/0076; A23L 1/0073; A23P 1/105; A23P 1/12
USPC ......... 426/512, 514, 517, 582, 515, 516, 520, 426/524; 99/450.2, 450.1, 452–466; 425/259, 371–372, 115–116
See application file for complete search history.

(56) References Cited

U.S. PATENT DOCUMENTS

| 2,907,109 | A | * | 10/1959 | Palmer | 425/224 |
| 4,112,835 | A | | 9/1978 | Mongiello | |
| 4,128,369 | A | * | 12/1978 | Kemerer et al. | 425/113 |
| 4,392,801 | A | * | 7/1983 | Meyer | 425/71 |
| 4,448,793 | A | * | 5/1984 | Akesson | 426/241 |
| 4,626,439 | A | | 12/1986 | Meyer | |
| 4,665,811 | A | * | 5/1987 | Meyer | 99/455 |
| 5,505,599 | A | * | 4/1996 | Kemerer et al. | 425/4 C |
| 5,527,551 | A | * | 6/1996 | Fager et al. | 426/515 |
| 5,529,795 | A | * | 6/1996 | Aldrovandi | 426/231 |
| 5,601,855 | A | * | 2/1997 | Fager et al. | 425/294 |
| 5,700,495 | A | * | 12/1997 | Kemerer et al. | 425/190 |
| 5,792,497 | A | | 8/1998 | Abler et al. | |

(Continued)

OTHER PUBLICATIONS

"Pull", Merriam-Webster Online Dictionary and Thesaurus (Jan. 12, 2012)  https://web.archive.org/web/20120125221159/http://www.merriam-webster.com/dictionary/pull.*

*Primary Examiner* — Drew Becker

(57) ABSTRACT

An invention directed to the production of processed or cooked cheese by concurrently and continuously portioning, pulling to stretch, molding and cooling to set said cheese through a series of interconnected tunnels casted within two overlaying rotating belts. The overlaying belts having a series of grooves with negative dimension of a desired cross sectional shape for molding purposes. The two belts overlay each other such that the grooves combine to form a continuing tunnel along the length of the two belt assembly. Cheese is pulled into and through each tunnel wherein a given amount of pressure and cooling affect is applied. Released cheese ribbons of molded shape are ready for immediate packaging and storage.

6 Claims, 5 Drawing Sheets

(56) References Cited

U.S. PATENT DOCUMENTS

| | | |
|---|---|---|
| 6,440,481 B1* | 8/2002 | Gascoigne et al. ........... 426/582 |
| 8,932,657 B2* | 1/2015 | Nelles et al. ................. 426/241 |
| 2005/0208193 A1* | 9/2005 | Cortes-Martinez et al. .. 426/582 |
| 2007/0098861 A1* | 5/2007 | Biggel .......................... 426/512 |
| 2008/0018014 A1* | 1/2008 | Bosler ....................... 264/210.2 |
| 2009/0226580 A1* | 9/2009 | Singleton ..................... 426/271 |
| 2012/0258226 A1* | 10/2012 | Lindgren ...................... 426/517 |
| 2012/0308679 A1* | 12/2012 | Biggel et al. .................. 425/371 |
| 2013/0115354 A1* | 5/2013 | Kuhn et al. ................... 426/517 |
| 2013/0156919 A1* | 6/2013 | Schmidt ....................... 426/517 |
| 2013/0209641 A1* | 8/2013 | Kot .............................. 426/516 |
| 2014/0193559 A1* | 7/2014 | Zeuschner et al. ........... 426/512 |
| 2014/0322414 A1* | 10/2014 | Young et al. .................. 426/515 |
| 2014/0377430 A1* | 12/2014 | Biggel et al. ................. 426/515 |

\* cited by examiner

CHEESE FORMING APPARATUS AND METHOD

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark office, patent file or records, but otherwise reserves all copyright rights whatsoever.

BACKGROUND OF THE INVENTION

1. Field of the Invention

The present inventive subject matter relates to the formation of cheese sticks and string cheese, particularly of the pasta filata type.

2. Background

Natural cheese, particularly of the pasta filata family (including but not limited to mozzarella, provolone, or blends thereof) have plastic or elastic qualities that make it pliable for molding when heated (typically between 120 F to 160 F). At the same time, pliability in this heated state prevents the cheese from being self supporting (independently hold its own weight and shape).

For purposes of packaging cheese with a prescribed shape, specifically pasta filata type cheeses, it is necessary that the external layer of a formed piece of cheese be sufficiently cool to hold its own shape and weight while the internal warmer portions be cool enough not to reheat and deform the external layer (otherwise known in the industry as "slumping"). This stage of cooling is called "setting". Once a piece of cheese has set, it is able to independently maintain a prescribed shape ("self supporting") and hence be ready for packaging and shelving.

Large scale production of string cheese or cheese sticks follow a multi-step process in the current art. A typical method of producing mozzarella type string cheese is discussed in U.S. Pat. No. 5,792,497, where a nascent warm mass of cheese is extruded through a die with circular holes, creating ribbons of cheese of preferred shape or dimension. The extruded cheese being still warm and sticky is further buoyed in a cooling medium such as brine solution bath to properly set. The set cheese is then cut to size. Although the dies could have other shaped holes, the fact that the cheese is still in its warm molten state at the time of extrusion through the die makes it very difficult for the cheese to maintain shape for the remaining steps of the long process. For this reason, the round shape remains the standard shape for practical purposes. U.S. Pat. No. 4,112,835 describes an alternative method for molding string cheese where highly elastic warm cheese is conveyed by an auger onto a chamber. Empty molds of preferred shape and dimension pass over the chamber where the warm cheese is pressed into the mold. The filled molds are then chilled to a preferred temperature. The product is then released into a secondary brine bath for final cooling. Still a third method, as in U.S. Pat. No. 4,626,439 provides for slicing or trimming cheese to size after initial processes of rolling into flat sheets and cooling to set in separate brine bath. In any case, current methods of large scale cheese stick production require separately staged steps for portioning, shaping, and cooling the cheese. Separate staging of each step delays actual cooling of individual cheese products, thus begging the need for rapid cooling in mass to accommodate fast high volume demand.

This multi-stepped technique of separately portioning, shaping and cooling the cheese results in substantial loss of time and space as well as loss of inherent desirable qualities within the cheese. Extensive floor space is required to accommodate each separate step of the process. The cheese sticks quickly lose their shape when released too soon into the brine bath channels and allowed to travel unguided. The channel flow and floating mass of sticks tends to create "log jams" and a high percentage of the sticks are bent or deformed. Sticks that are too bent are culled and sent back through the entire process, affecting flavor and texture of the final batch. Extensive time submersed in brine solution further results in substantial loss of butterfat, uneven salting of the cheese, misshapen form from impact with other surfaces and increased risk of contamination.

A great deal of money and energy is spent by cheese manufacturers to manage cheese byproducts and to maintain clean brine solution. The initial steps of forming cheese by extrusion tends to excessively work the cheese, cutting into cheese fibers and internal pockets that naturally retain fat, moisture and flavor. Moisture and butterfat forced from the cheese by the high pressure extrusion process finds its way into the brine solution. This loss of moisture and butterfat content causes substantial decrease in quality of flavor and overall mass of the cheese. Over time, the chilled butterfat coagulates and floats through the brining channels plugging up channel flumes. Unmanaged butterfat trapped within brine channels become a source for bacterial and pathogenic contamination. Moisture naturally released from brined cheese further dilutes the brine solution, causing overflow of the flumes. The excess brining liquid must be periodically disposed of while the remaining solution is recalibrated for proper chemical concentration. Special treatment of the brine waste is needed since salt brine is considered hazardous waste. Despite the costliness of this process, brine cooling remains the popular method for mass cooling of cheese products since current techniques cannot cool and set cheese fast enough on an individual basis to accommodate high volume manufacture demands.

Cheese forming techniques applied at the high volume manufacture level does not reflect best practices in the art of cheese making. True artisanship requires the nascent cheese mass be stretched and separated by pulling and pinching methods, not by extrusion or cutting. Salting and seasoning of the cheese should ideally occur at initial stages of cooking and not by immersion in salty brine after ideal texture and flavor has been achieved. Molding of the cheese requires proper setting before release to the external environment so as to minimize deformation. In view of the foregoing, there remains a considerable need for inventive solutions that improves upon the quality and efficiency of cheese production at the high volume level.

All patents and applications referred herein are incorporated by reference in their entirety. Furthermore, where a definition or use of a term in a reference, which is incorporated by reference herein is inconsistent or contrary to the definition of that term provided herein, the definition of that term provided herein applies and the definition of that term in the reference does not apply.

SUMMARY OF THE INVENTION

An invention directed to the production of cheese sticks or string cheese, of either processed or cooked cheese (particularly of the pasta filata type such as mozzarella, provolone and blends thereof) by concurrently and continuously portioning, pulling to stretch, molding and cooling to set said cheese through a series of interconnected tunnels casted within two overlaying rotating belts. Each of the two overlaying belt having a series of grooves along its length with negative dimension of a desired cross sectional shape for molding purposes. The two belts overlay each other such that the grooves combine to form a continuing tunnel along the length of the two belt assembly. Cheese is pulled into and through each tunnel by opposing rotational movement of each belt assembly. Pressure is externally applied against the belt overlay to manipulate molding preference and internal fiber formation of the cheese. Cooling occurs concurrently by indirect heat transfer through the thermal conductive tunnel walls. Released cheese ribbons may be cut to preferred length for immediate packaging or storage. Alternatively, released cheese ribbons may be further combined by lamination with additional mechanism to form new stick shapes such as, but not limited to rolls, ribbing, braids, twists, etc.

Since the various events of portioning, stretching, molding and cooling to set are combined in a concurrent process, a continuous and non-interrupted process of producing high quality cheese is achieved. Pulling the cheese through narrow tunnels naturally applies pressure such that the internal cheese fibers are aligned to produce natural string texture. The cheese is concurrently cooled by transient heat transfer through the thermal conductive walls of each tunnel it is being pulled through, thus eliminating the need for a separate cooling process. Ribbons of cheese released from the system are cooled and molded to set such that when cut to shape, each stick is perfectly straight, smooth and ready for immediate packaging. Without need for a separate cooling process as in typical brining, retention of inherent flavor, moisture and butterfat is maximized.

The inventive device discussed herein is uniquely devised and adapted for the production of cheese sticks and string cheese. In the preferred embodiment, a warm nascent cheese mass would be pulled through tunnels of specific cross sectional shape where the cheese is portioned and molded. The tunnels in this invention are created by the overlay of two belts casted to shape. The overlay of the two belts on top of each other creates a series of tunnels along the length of each belt where the cheese is pulled through. Pressure is uniquely applied on the overlay to maintain constant pressure against the tunnels to prevent expansion beyond its cavity and to improve on internal fiber formation of string cheese. Each of the two belts is continuously wrapped around a gear system that drives and pulls the belts forward in a rotating manner. The two belts move towards the same direction, in opposing rotating direction so that the belts collapse upon themselves on one end and peel away at the other end. This manner of motion makes the device self feeding such that no additional mechanism is required to direct the cheese through from one end to the other. Rotation of the belts with applied pressure against the overlay drives the cheese through the tunnel molds in the desired manner, stretching the cheese fibers to the desired degree. The length of each tunnel and the amount of pressure applied affects the formation of cheese fibers. In nearly every case in which pasta filata type cheese is pulled through this device, string cheese is the natural product. However, other types of cheese such as processed cheese or cheese blends may be pulled through this system as well to produce cheese sticks.

Behind each belt assembly is a heat exchanger where cooling medium is fed through to create a cold temperature gradient at the point of contact between cheese and the belt tunnel surface. The heat exchanger may embody any form and material which is thermally conductive and can contain and facilitate a continual flow of cooling medium (such as but not limited to any combination of gas, liquid or solid) of desired temperature. The purpose of the heat exchanger is simply to adjust and control the external temperature in order to create a temperature gradient between the warm cheese and the tunnel surface where the cheese is in direct contact with. The further purpose of the heat exchanger is to facilitate transient heat exchange between the cheese within the tunnel and the external cooling medium while avoiding direct contact between the two. Any means known in the art that may accomplish these intentions not otherwise stated herein would fall within the scope and spirit of this invention. For example, the heat exchanger may be separate units coupled to the belt assembly or it may be connected to or embedded within the belt assembly, such that the device remains self feeding while the thermal conductive cooling, pulling, stretching and molding processes continue continually and concurrently.

The invention described herein drastically changes the quality and efficiency of cheese sticks currently produced in the market. Since brine cooling is no longer a necessity due to this invention, typical expenses associated with the production of cheese sticks, such as refrigeration, hazardous waste removal, brine cleaning and maintenance, and floor space requirement are minimized or entirely eliminated. Inconsistencies in cheese stick content and mass impacts quantity control. Pulling cheese through narrow tunnels where it is stretched and molded under constant pressure, the cheese stick product achieves greater internal consistency and continuity. This is an improvement of the typical extrusion process. The improvement provided by this invention allows for more accurate product and price management. Further, no moisture, butterfat or flavor is lost by this manner of processing. The manner by which cheese is molded in this invention opens up a window of choices for cheese stick shapes beyond the current traditional round shape. The overall manner of cheese making under this invention completely changes the quality and style of mass produced cheese sticks and string cheese in the market.

Other features, advantages, and object of the present invention will become more apparent and be more readily understood from the following detailed description, which should be read in conjunction with the accompanying drawings.

BRIEF DESCRIPTION OF THE DRAWINGS

The present invention is illustrated by way of example, and not by way of limitation, in the figures of the accompanying drawings and in which like reference numerals refer to similar elements. Unless otherwise indicated illustrations in the figures are not necessarily drawn to scale.

DETAILED DESCRIPTION OF THE PREFERRED EMBODIMENTS

Reference will now be made in detail to exemplary aspects of the present invention which are illustrated in the accompanying drawings. Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Figure 1:
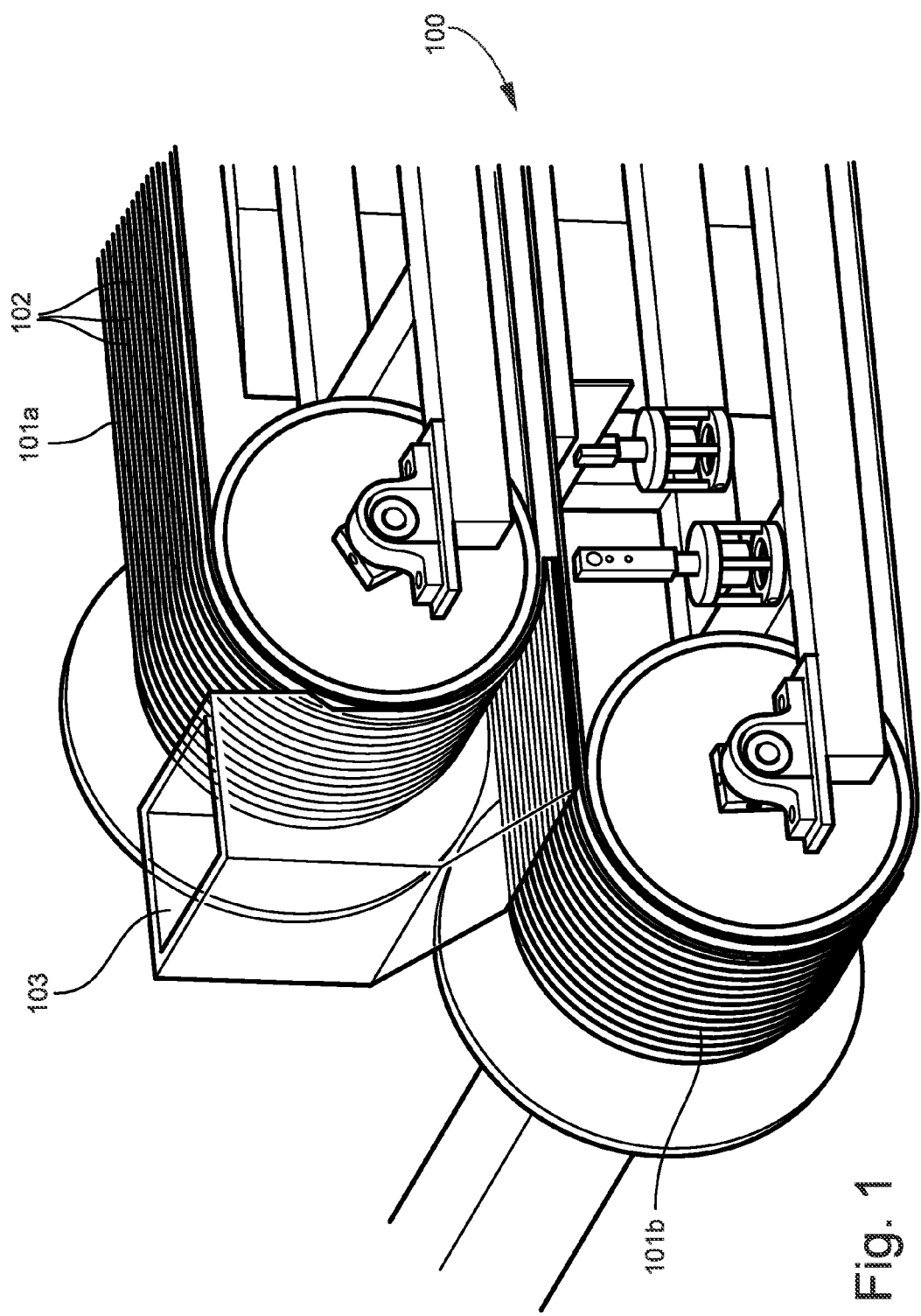
FIG. 1 is a three dimensional side view of the front proximal end of said device according to one embodiment of the invention described herein.
Figure 2:
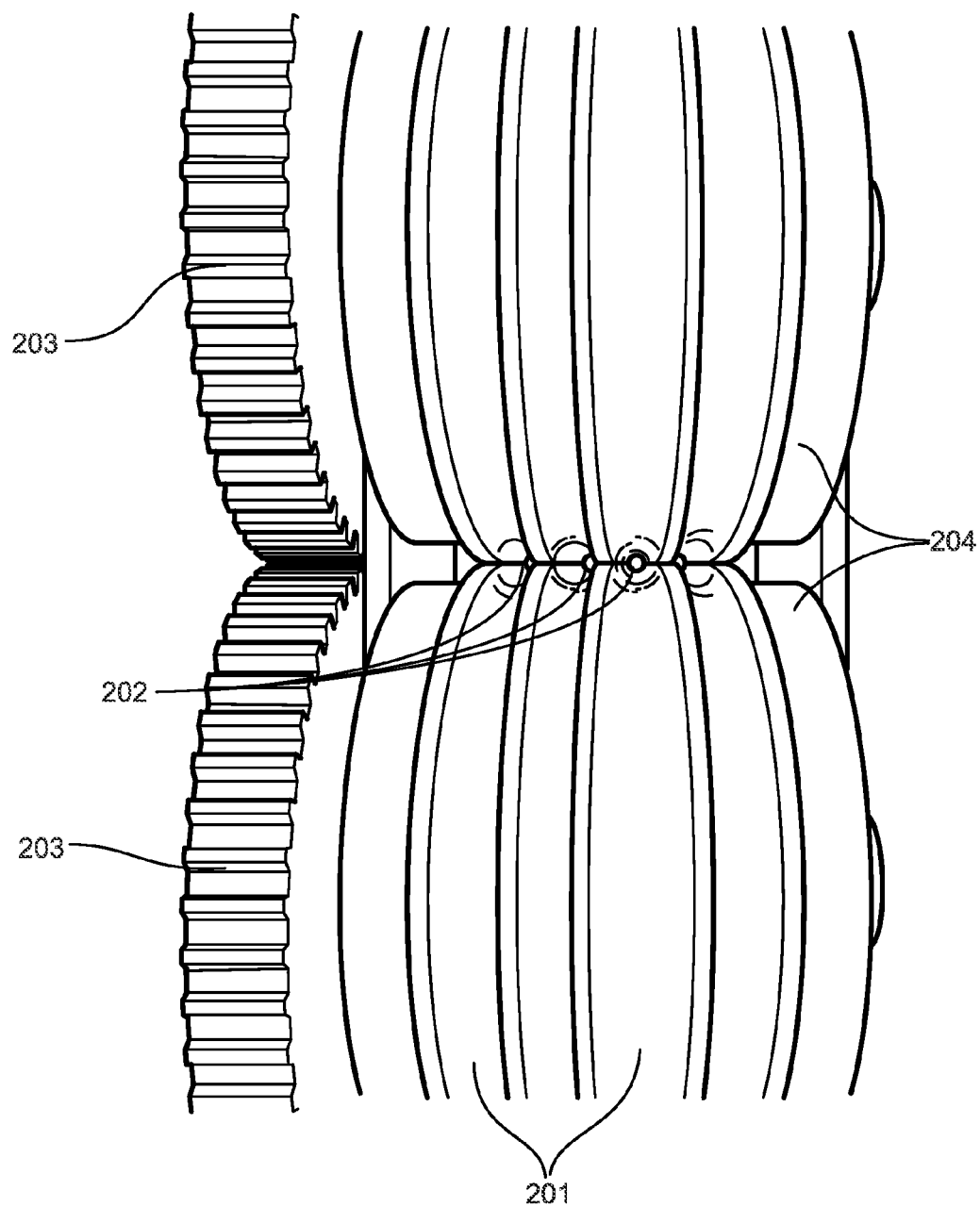
FIG. 2 is a front three dimensional view of either proximate or distal ends of the invention according to one embodiment of the invention described herein.
Figure 3:
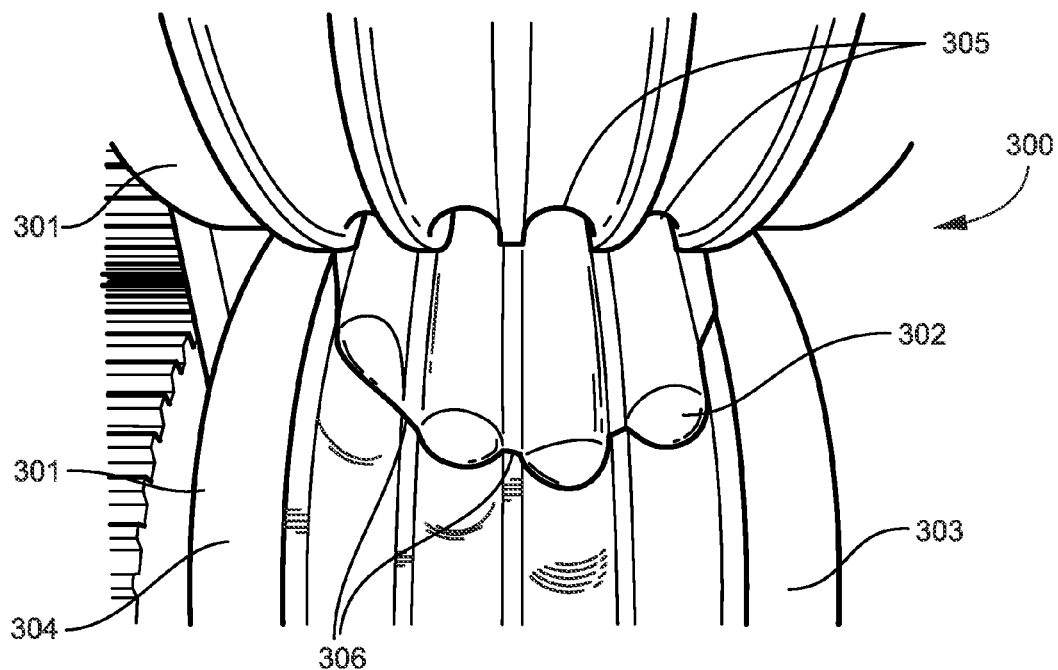
FIG. 3 is a front three dimensional view of formed cheese sticks connected by cheese webbing released from the distal end of the belt overlay according to one embodiment of the invention.

In one example of the inventive subject matter according to FIG. 1, a device 100 comprising two continuous rotating belt assemblies 101a, 101b, each belt casted with grooved channels 102. The grooved channels face outward. The two belts 204 overlay each other such that the grooved channels 201 of each belt form closed tunnels 202 in the overlay position. See FIG. 2. Each belt 204 is seated on one or more rotating gear assembly 203. The gear assembly 203 serves to actuate, drive and direct movement but may also assist in controlling tension of the belts 204. Movement of the gears 203 may be activated by any known means in the art such as, but not limited to, pneumatic, electric, magnetic, or manual force. Both belts 204 rotate in tandem in said overlay position at the same speed towards the same lateral direction but in opposing rotational direction from each other whereby one end of the two belts converge upon each other while the other end splits or pulls apart. The location where the belts 301 pull apart is where the final cheese product 302 is released for immediate storage, packaging or further processing. See FIG. 3. The speed of the gear 203 or belt 204 rotation is adjustable. Rotation of the two belt assembly or system in the overlay position 204 in response to gear rotation should produce smooth and continual tunnel movement from a proximal end to a distal end. As the grooves from the two belts 101a,b come together at the proximal end forming tunnels from the overlaid grooved channels, the cheese mass placed at this infeed location 103, in some cases through a trough 103 as illustrated in FIG. 1, will be captured or gripped between the overlaying belts and pulled into and through the moving tunnel to a releasing distal end 302, as shown in FIG. 3. As the cheese is pulled through the belt tunnel system, the cheese mass is portioned, stretched and molded to the cross sectional shape of each tunnel forming strips of cheese ribbons or strings 302.

See FIG. 3. For purposes of portioning and molding cheese strips, no side walls to the left 303 and right 304 sides of the two belt assembly is required. FIG. 3. Molding and portioning of the cheese strips 302 is achieved with the pressurized mechanical belt 301 overlay 300 and grooved tunnel 305 assembly alone. The belts are considered self feeding in that no additional mechanism beyond rotation of the belts 301 and an adjustably applied pressure against the belt overlay 300 is required to move the cheese through the forming tunnels 305. Rotation of the belt 301 may be actuated by simple mechanical gear system 304, or any known method in the art that effectively achieves the manner and purpose of the described invention herein.

Material composition of the two belts 101a,b described above should be composed of thermally conductive, food grade, durable material with some flexibility and stretch resistance. The belts are themselves cast or molded to desired cross sectional shape 401a,b,c. See FIG. 4. Additional reinforcement of the belt system may include coupling or embedding the belt material with the following such as but not limited to glass fiber strands, Kevlar®, carbon fiber, polyester, metal strands. The cheese mass that is pulled through the belt tunnel would be cooled through the tunnel walls of the belt cast 402 by conductive heat transfer. On the back side of each belt 501a,b is a heat exchanger 502 (or cooling unit) with a thermal conductive interface surface. See FIG. 5. The exchanger's interface surface is in direct contact with the belt's back surface 501a,b. See FIG. 5. According to FIG. 5, cooling medium flows through the heat exchanger 502, the cool surface of the heat exchanger 503 being in direct contact with and cooling the warmer surface 501a,b of the belt system. Material composition of the exchanger surface 503 that is in contact with both the cooling medium and the belt 501a,b should be thermally conductive. In the preferred embodiment, the exchanger surface 503 is composed of metal with high thermal conductivity and low specific heat. This facilitates immediate heat exchange and a controllable constant temperature gradient between the internal cavity of the belt 501a,b tunnels and the cooling medium of the heat exchanger. As a result, heat is exchanged through the belt walls and the exchanger surface between the warm cheese mass and the flow of cooling medium.

The heat exchanger 502 may be embodied in the form of blocks, panels, pipes or other forms and methods known in the art for circulating a continuous flow of cooling medium through channels 505 or producing a constant cold temperature. The heat exchanger 502 may provide additional structure and support to the rotating belt assemblies 506. See FIG. 5. The purpose of the heat exchanger 502 is simply to adjust and control the external temperature in order to create a temperature gradient between the warm cheese and the tunnel surface where the cheese is in direct contact with. The further purpose of the heat exchanger 502 is to facilitate transient heat exchange between the cheese within the tunnel and the external cooling medium while avoiding direct contact between the two. Any means known in the art that may accomplish these intentions not otherwise stated herein would fall within the scope and spirit of this invention.

According to initial prototypes, the rate of belt rotation achieving five minutes of cheese ribbon exposure to a cooling temperature of 50 F.° is sufficient to bring the core initial temperature of 140 F.° down to approximately 60 F.°. The length of the belt tunnels in relation to the speed of belt rotation determines the period of exposure of each cheese ribbon to a preferred cooling temperature. As such, cooling rate of the cheese ribbon held inside each belt tunnel becomes a function of the temperature gradient, the belt tunnel length and the speed of belt rotation.

Figure 4:
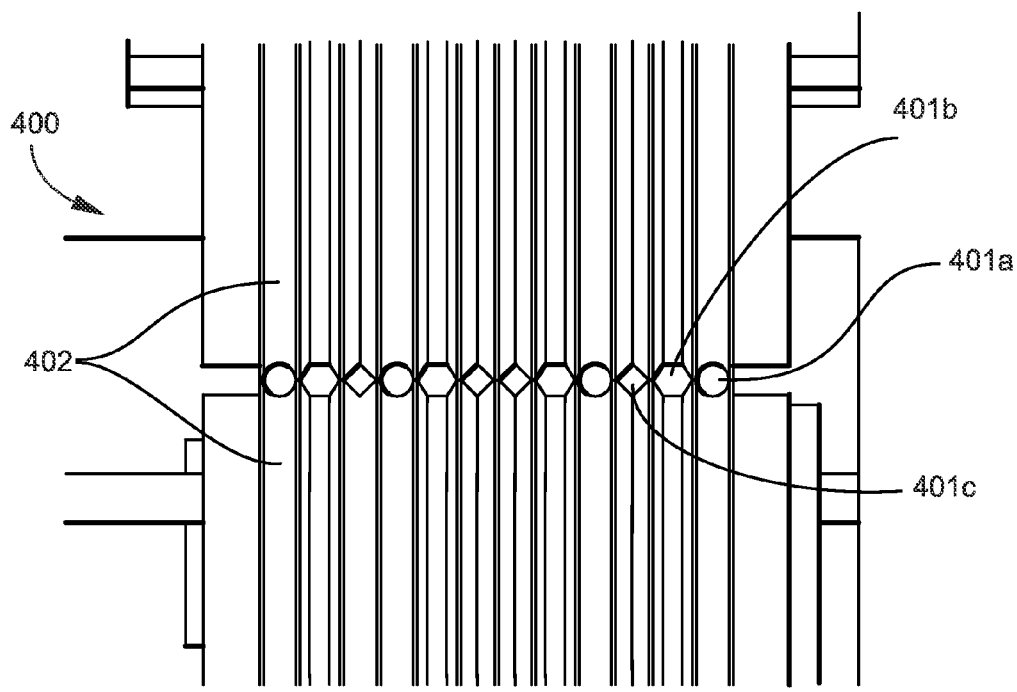
FIG. 4 is a front three dimensional view of several cross sectional tunnel or groove shapes according to one embodiment of the invention.
Figure 5:
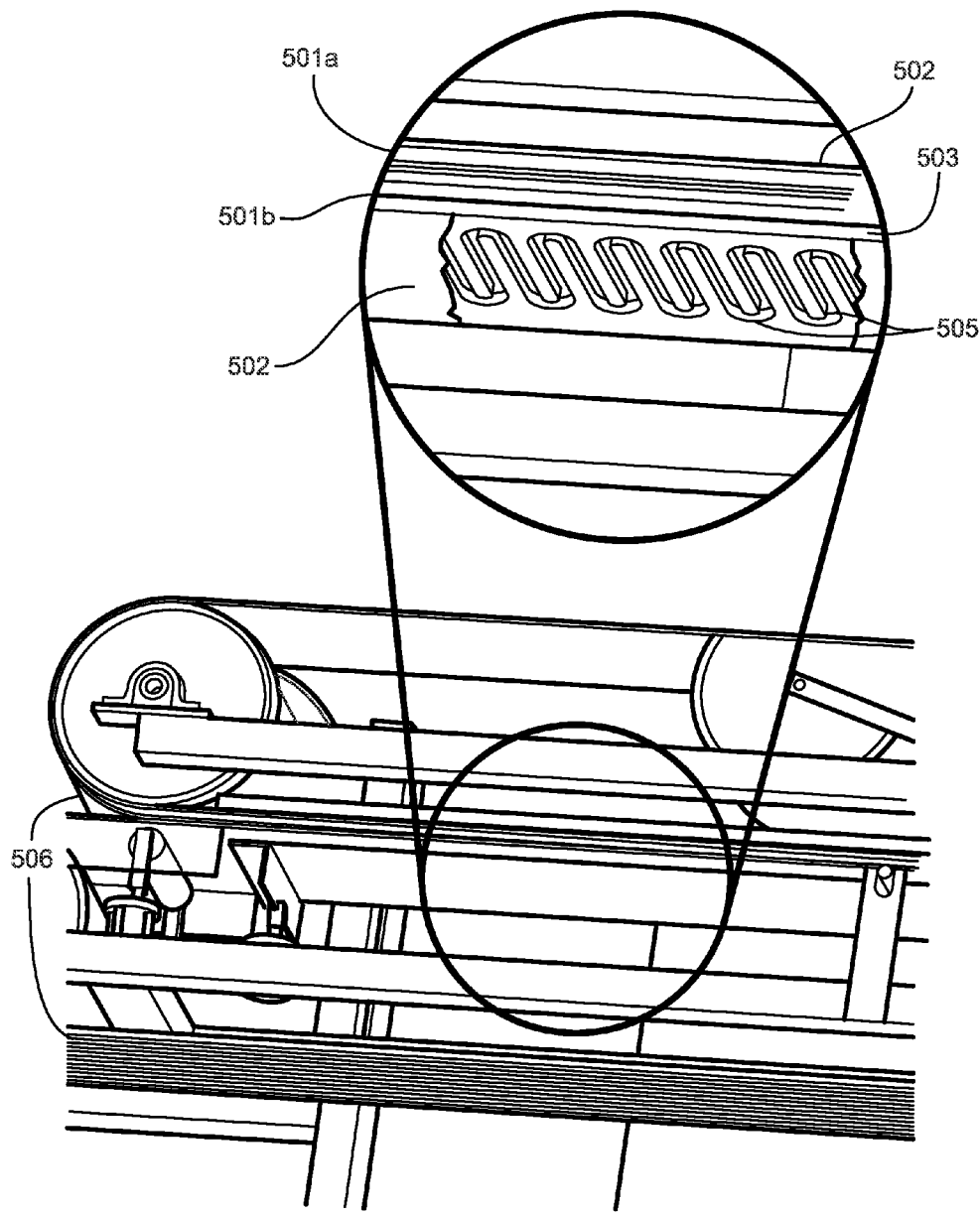
FIG. 5 is a three dimensional and cross sectional view of a belt assembly and heat exchanger according to one embodiment of the invention.
Figure 6:
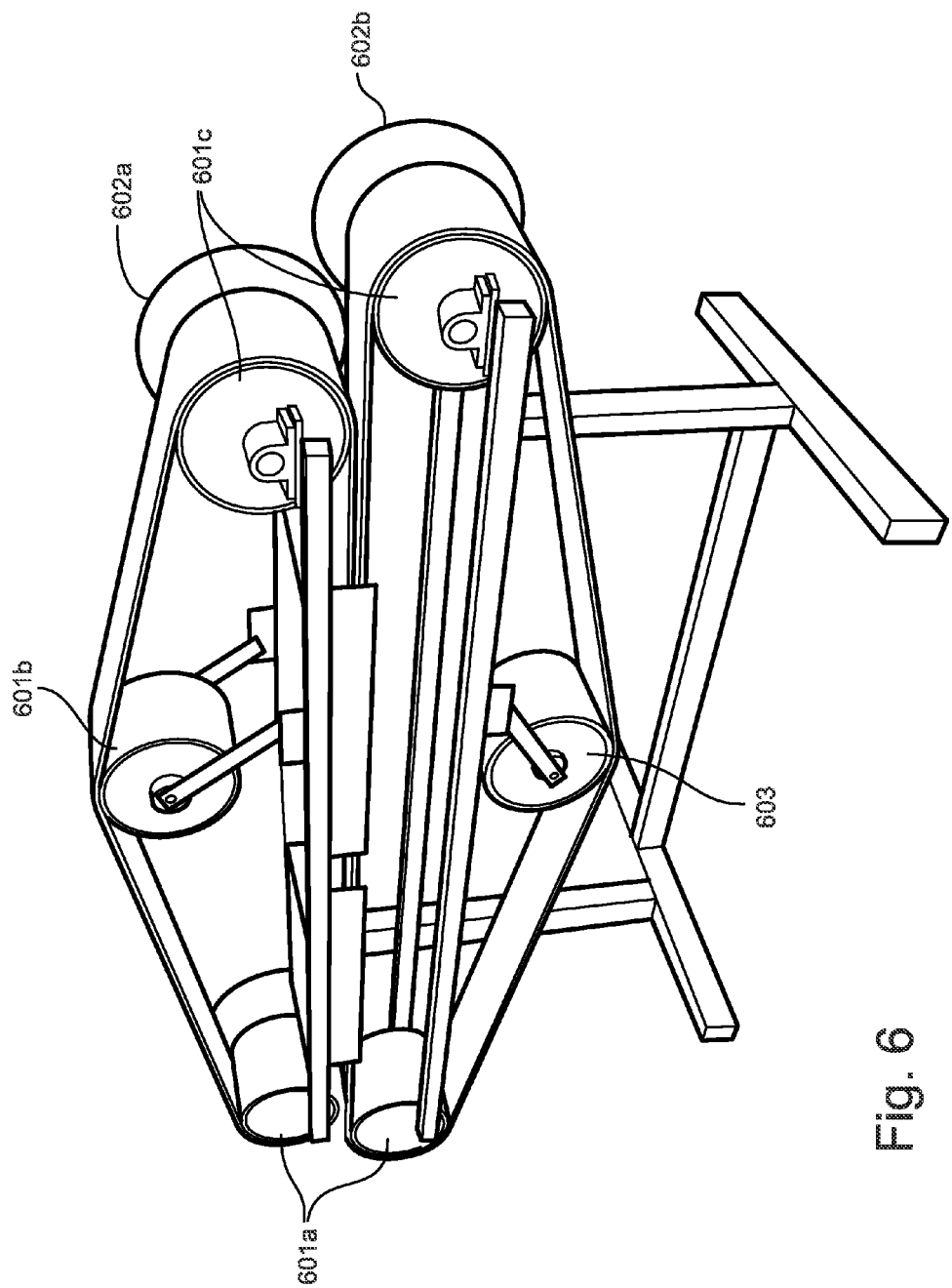
FIG. 6 is a three dimensional side view of said device according to one embodiment of the invention described herein.

The grooved channels of each belt may be cast to any cross sectional shape 401 *a,b,c*. In fact, more than one shape 401*a, b,c* may be cast together for each series of channels 401 *a,b,c* or tunnels on each set of belts, as illustrated in FIG. 4. The commercial product no longer needs to be limited to traditional round cross sectional shapes. Cheese ribbons of different cross sectional shape, for example hexagonal 401*b*, diamond 401*c* and round shapes 401*a* may be produced simultaneously in a single series 400. See FIG. 4. Pressure applied against the belt overlay may be adjusted such that greater pressure would result in separate strands of cheese released while less applied pressure would result in strands interconnected with cheese webbing 306 of varying thickness. See FIG. 3. Durability of the belt's material composition may further affect the quality of the mold and molding process. In one embodiment of this invention, high durometer polyurethane was used to control flexing of the belt under high pressure so as to control the degree of webbing 306 between sticks. However, any equivalent material capable of achieving the preferred goals of this invention may be used interchangeably. Pressure rollers 601*a,b,c* connected to or coupled with the gear assembly 602 *a,b* anywhere along the length of the belt assembly may control the amount of pressure applied on the overlaying belts. See FIG. 6. In the exemplary embodiment of FIG. 6, pressure rollers 601*a,b,c* above and below the belt overlay are located at proximal and distal ends and at the center of the device. The pressure according to this example is controlled and adjusted by a pulley system. The greater amount of pressure that is applied against the belt overlay as it compresses and portions the cheese, the less webbing 306 is realized between the series of cheese ribbons. In reverse, less pressure applied against the belt overlay would result in webbing 306 of greater thickness. See FIG. 3. Both ribbon forms 302, with or without cheese webbing 306, may be desirable features to manufacturers and would be easily accommodated by adjusting tightness and pressure of the belt overlay.

Having fully described at least one embodiment of the present invention, other equivalent or alternative devices that self feeds warm cheese through narrow pressure tunnels whereby the cheese is concurrently and continuously portioned, stretched, molded and indirectly cooled to produce string cheese and cheese sticks will be apparent to those skilled in the art. The invention has been described by way of summary, detailed description and illustration. The specific embodiments disclosed in the above drawings are not intended to be limiting. Implementations of the present invention with various different configurations are contemplated as within the scope of the present invention. The invention is thus to cover all modifications, equivalents, and alternatives falling within the spirit and scope of the following claims.

The invention claimed is:

1. A method for forming continuous ribbons of string cheese by capturing and pulling a warm pasta filata cheese mass into a plurality of moving enclosed hollow channels, wherein each said moving enclosed hollow channel being enclosed on all sides except at a first end wherein said warm pasta filata cheese mass is captured and a second end wherein a continuous ribbon of string cheese is released, pulling said warm pasta filata cheese mass to stretch from said first end towards said second end by unidirectional movement, cooling a portion of said warm pasta filata cheese mass within each said moving enclosed hollow channel by one or more temperature adjustable thermal conductive cooling means located at one or more location along said moving enclosed hollow channel, releasing one or more continuous ribbon of formed string cheese at said second end of each said moving enclosed hollow channel for immediate storage, packaging or further processing.

2. The method of forming cheese according to claim 1 in which a warm pliable cheese mass is pulled into one or more enclosed hollow channels, said hollow channels being embedded within two overlaying rotating belt assemblies, the counter-rotation of the two belt assembly causing said enclosed hollow channel to form at a proximate end and ending by separation at a distal end, the continual rotation of said belt assembly causing a continual formation and separation of said hollow channel, said cheese being captured and pulled at the forming end of said channel and released as a continual string of shaped cheese at the opposing separating end.

3. A method of forming continuous ribbons of string cheese according to claim 1 by pulling said warm pasta filata cheese mass into and through said plurality of moving enclosed hollow channels from said first end towards said second end, said plurality of moving enclosed hollow channels comprising two belts each of a given circumference width, each said belt being looped around a first rotating end and a second rotating end, each said belt having a plurality of semi-hollow grooves, said semi-hollow grooves of said first belt overlayed over said semi-hollow grooves of said second belt in compressed manner forming said plurality of enclosed hollow channels, said first and second belts moving in counter rotation against each other causing unidirectional movement of said plurality of enclosed hollow channels from said first end towards said second end capturing and pulling a warm pasta filata cheese mass into each said first end of each said enclosed hollow channel, pulling and stretching said warm pasta filata cheese mass within each said enclosed hollow channel, cooling portions of said warm pasta filata cheese mass at one or more location to one or more preset temperature within each said enclosed hollow channel, releasing one or more continuous ribbons of string cheese from said second end of each said enclosed hollow channel.

4. The method of cooling cheese according to claims 1 or 2 wherein the rate of cooling a warm cheese mass that is being pulled through a hollow channel is adjustable by varying the length of the hollow channel relative to the temperature gradient between the walls of said channel such that the period of exposing said cheese mass to the low temperature gradient is sufficient to set the cheese.

5. A method of forming continuous ribbons of string cheese according to claim 3 wherein said one or more temperature adjustable cooling means each comprising solid food grade thermo-conductive material containing an enclosed continual flow of chilled flowable coolant, each said temperature adjustable cooling means being in direct contact with said plurality of enclosed hollow channels at one or more location, said temperature adjustable cooling means creating a low temperature gradient between said temperature adjustable cooling means and said enclosed hollow channel, cooling a portion of said warm pasta filata cheese mass within each said enclosed hollow channel by thermo-conductive transfer of heat from said warm pasta filata cheese mass towards said temperature adjustable cooling means.

6. A method of forming continuous ribbons of string cheese comprising:

A container for holding and releasing a warm pasta filata cheese mass onto a counter-rotating dual compression belt system, Said counter-rotating dual compression belt system having a first and second circular belt, each said first and second circular belt being compressed against each other to form a length of compressed area, each said belt having a plurality of long grooves along its circumference, said plurality of long grooves of said first belt aligning against said plurality of grooves of said second belt at said compressed area to form a plurality of enclosed hollow channels, each said enclosed hollow channel of said plurality of enclosed hollow channels having a hollow cross-sectional shape and is open at a first end and a second end, said first and second circular belt moving in counter rotation against each other causing unidirectional movement of said compressed area, one or more temperature adjustable cooling units cooling said compressed area to one or more preset temperature at one or more location by direct contact with said compressed area, each said temperature adjustable cooling unit containing an enclosed flow of coolant, Said method of forming continuous ribbons of string cheese wherein:

A warm pasta filata cheese mass is formed in hot liquid,

Transferring said warm pasta filata cheese mass onto said container,

Releasing said warm pasta filata cheese mass onto said counter rotating dual compression belt system, Capturing and pulling said warm pasta filata cheese mass into said first end of each said enclosed hollow channel by unidirectional movement of said compressed area, Stretching and shaping a portion of said warm pasta filata cheese mass by pulling said warm pasta filata cheese mass from said first end towards said second end of each said enclosed hollow channel, Cooling a portion of said warm pasta filata cheese mass to one or more preset temperature of said one or more temperature adjustable cooling units at one or more locations within each said enclosed compressed moving hollow channel, Forming and releasing a continuous ribbon of string cheese from each said second end of each said enclosed compressed moving hollow channel.

\* \* \* \* \*